3,102,730
METHOD OF MANUFACTURING GRAMOPHONE RECORDS CARRYING VISUAL MATERIAL
Luise Bardowicks and Konrad Haseloff, Luneburg, Germany; said Haseloff assignor to said Bardowicks
Filed Oct. 27, 1958, Ser. No. 769,911
Claims priority, application Germany Oct. 30, 1957
17 Claims. (Cl. 274—42)

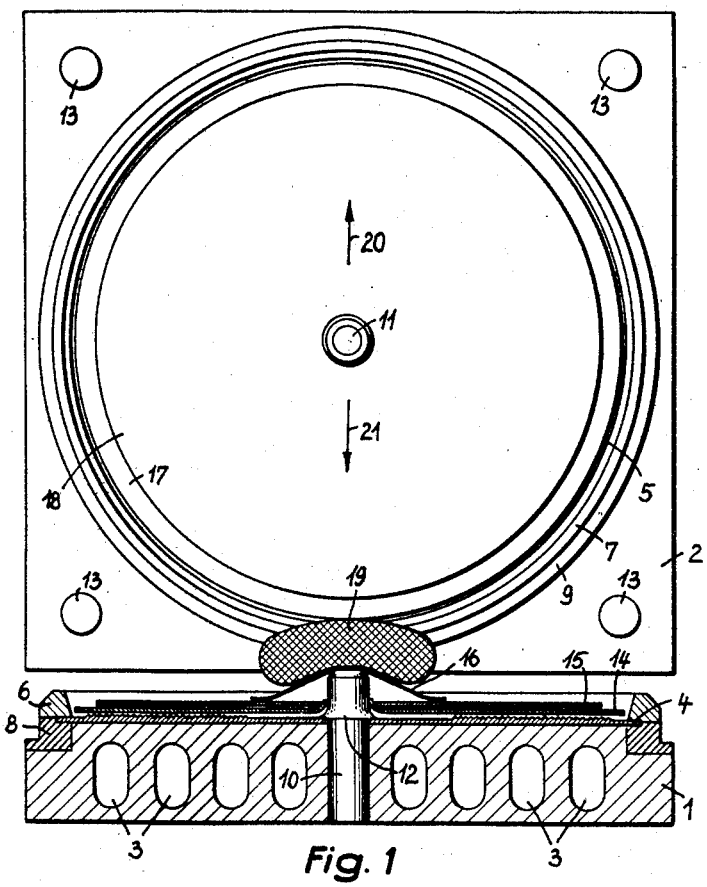
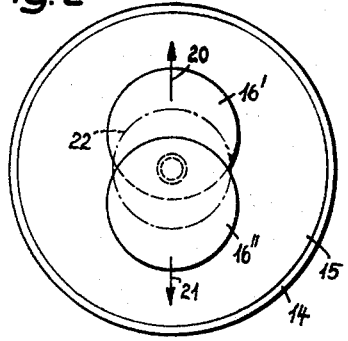
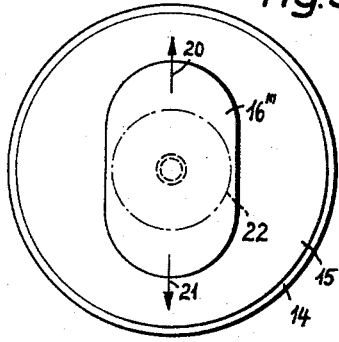

The invention concerns a method of manufacturing gramophone or phonograph records of the kind carrying visual material, which records consist of a plastic or deformable core, preferably of thermoplastic material, a printed sheet of paper disposed on each side of the core, and having an outer diameter which is preferably less than that of the sound record, and transparent foils of a material suitable for the recording thereon of the sound tracks, which foils cover said sheets of paper. The method according to the invention is not limited to thermoplastic masses but could also be used if materials became available which could be shaped whilst cold in a pressing operation and could then be hardened for instance under the influence of pressure alone.

The two sides of gramophone records produced from dark coloured, and generally black raw materials are each provided at their centre with a printed paper label on which the particulars of the record, e.g. the firm of manufacturers, the title, the persons performing etc. are stated. In order to be able to provide gramophone records with both explanatory and also educational material, records have been produced composed of several layers which are referred to as gramophone records carrying visual material. The two outer layers of a known gramophone record carrying visual material consist of transparent substances such, for instance, as cellulose ester foils in which the sound tracks are impressed before the foils are combined with one or more other layers to make the record.

It has also been proposed to arrange several layers of various raw materials above one another and to press the sound tracks into the outer transparent layers of the record only during the pressing operation. Such records thus consist, if they are double sided records, of a core of non-transparent material, of two sheets for instance of paper, on which the text or the visual representation is printed or photographed, and of two discs of a transparent material which cover the sheets of paper, and are disposed on each side of the core and which are provided with sound tracks whilst the individual members of the record are being pressed together.

Numerous proposals for combining these individual elements together have already been made, which have not proved satisfactory because the individual elements of the record have become separated from one another again after a comparatively short time. Although these difficulties can be avoided by the use of more suitable adhesives, all previous attempts for the production of a gramophone record carrying visual material have hitherto failed because the inserts or sheets carrying the visual material, which have to be subjected to the pressing operation, tore during the process of pressing on account of the unavoidable lateral displacements of the plastic core which take place during the production of the hardened core. Even if now and again it has been possible to produce satisfactory records carrying visual material, the wastage which occurred was so great that the production of gramophone records carrying visual material has not been worth while.

It is an object of this invention to reduce these generally known difficulties in the production of gramophone records carrying visual material and to provide for the production of such records with a substantial reduction in the wastage involved.

The invention consists in interposing, in the mould, between each of the two sheets of paper on the one hand and the core mass on the other hand, at least one insert whose surface is smaller than that of the printed surfaces.

For the production of records according to the invention, when using a thermoplastic core material, a two part mould is used which can be both heated and cooled and which can be introduced into a press. The halves of this mould each have a central pin at least one of which is axially displaceable. After placing one foil and one sheet of paper printed on one side, both of which have a hole in the centre, onto each of the two matrices of the mould, an insert in the form of a soft polyvinyl chloride foil of the smallest possible thickness which serves to cover the central pin, is placed on the sheet of paper in the lower mould half. A lump of core forming material which is sufficient at least to fill the hollow space which results upon closing the mould is then placed upon said foil insert, a similar foil insert which at least partially covers this core forming material is placed thereon whereafter, the mould is closed and the record is pressed in known manner, by the application of heat and pressure.

During the pressing process, the core mass is distributed in a generally radial direction and fills the hollow space remaining in the mould. It is simplest to provide a quantity of core forming material which is greater than the volume of this hollow space so that the surplus material can emerge at the edge of the mould. The material which emerges becomes rigid at the end of the pressing process in the same manner as the record itself and can, when the pressed article is taken out of the mould, be easily broken off so that it is then only necessary to trim the peripheral edge of the record.

Experiments have shown that the most advantageous shape of the plastic foil to be inserted between the core material and the paper is not always a circular shape. If a soft polyvinyl foil is used, one surface of which is smooth and glossy, whilst the other surface is smooth and matt, it being immaterial which of the two surfaces faces the core material, a centrally disposed circular insert on each side of the lump of core material is completely satisfactory to prevent tearing of the printed sheets of paper or the like during the pressing.

If, however, foils are used of which one surface is smooth and glossy, whilst the other surface is matt and roughened, then a tearing of the sheets of paper with moulds whose upper mould half is pivotable about a horizontal axis cannot be avoided by using inserts of circular shape. It is then preferred to use inserts having a dimension in one direction which is larger than the dimension in a direction at right angles thereto, the inserts being inserted so that their largest dimension extends in a direction which is at right angles to the pivotal axis of the upper half of the mould.

According to a further feature of the invention, two circularly shaped foil inserts of this kind can be used if, when they are inserted they are displaced with respect to each other, the displacement being in a direction at right angles to the pivotal axis of the upper half of the mould.

The inserts need not necessarily consist of foils of plastic material. If for instance, a suitably shaped green leaf of a tree, is placed on each side of the non-transparent mass of core material in the vicinity of the centre hole, whereafter the various layers are pressed together in the above described manner, no tearing of the printed sheets of paper takes place. Naturally the use of such leaves is excluded for sound records to be mass produced on account of their excessively great thickness and because they are profiled. They are visible on the finished sound record on light impinging thereon at an oblique angle; furthermore, the surface of the sound record in the areas where they are placed becomes milky. If, however, plastic foils are used as inserts, they will not be noticed when light falls on the records. The inserts, however, prevent the tearing of the printed sheets of paper because they ensure that displacements of the core material during pressing, at those areas where such displacements have an undesirable effect, i.e. in the vicinity of the central holes, are kept away from the paper.

It is, however, known in a gramophone record carrying visual material and consisting of a disc shaped core of rigid material with two printed paper inserts covering the two surfaces of the core, to arrange on each side a layer of a binding agent which can be applied to the rigid core by a dipping process. These layers of binding agents have the object of securing the paper inserts firmly to the rigid disc of the core which consists od aluminium or the like. These layers provided between the rigid core and the paper inserts have an entirely different function to that of plastic inserts according to the invention.

The invention is concerned not only with the production of gramophone records carrying visual material, but also with such records themselves.

Some preferred embodiments of the invention by way of example only will now be described with reference to the accompanying drawings in which:

FIGURE 1 is a front view of the upper half of a two part mould in the open position, such mould being suitable for the production of gramophone records carrying visual material according to the invention, the lower half of the mould being shown in section, FIGURE 2 shows diagrammatically the arrangement of two circular shaped plastic foil inserts before the core material is applied, and FIGURE 3 shows a modified form of insert.

The mould shown in FIGURE 1 consists of a lower mould part 1 and an upper part 2 in which the hollow spaces 3, serving for heating and cooling, are provided. The matrices 4, 5 which carry the negative of the sound tracks are secured e.g. by being threaded in the respective mould parts by means of rings 6 or 7 and further rings 8 or 9. Pins 10, 11 serve to provide centres for the matrices. Pin 10 is rigidly mounted in the lower mould part 1 and pin 11 is mounted in the upper mould part 2 so as to be axially movable under spring action. Pin 10 is provided with a collar 12, having a tip thereon, whilst the upper part 2 of the mould has a corresponding protrusion in the same area. Naturally also matrix 5 can be provided with a corresponding collar portion. The pivotal axis about which the upper part of mould 2 is pivotable, is not shown in the drawing. Centering pins 13 are shown which are adapted to engage holes provided in the lower part of mould 1, so that the two mould halves will be secured against lateral displacements immediately before and during the pressing operation.

If now it is desired to produce gramophone records carrying visual material by means of this press which is known per se, preferably first a transparent foil 14 to be provided with the sound tracks, the diameter of the centre hole of which is preferably slightly smaller than the diameter of pin 10, is pressed onto pin 10 with the result that adjacent the pin the foil 14 becomes funnel-shaped. Then a sheet of paper 15, printed on one side is laid onto foil 14. The pin 10 is then covered by an insert 16 of small thickness in the form of a soft polyvinyl chloride foil. Then in a similar manner a foil 17 to be provided with sound tracks and a sheet of paper 18, printed on one side, is placed upon pin 11, a lump of core forming material 19 heated in an oven is laid on insert 16, and its upper side is then covered with another insert (not shown) similar to insert 16. The upper part 2 of the mould is hinged down and the mould is then inserted in a press which is also not shown. Thus the record is pressed and the core-forming material 19 is radially extruded in situ between the printed paper sheets to form a laminated record, the in situ radial extrusion distinguishing from the mere superposition of pre-formed laminations. During the pressing the two mould halves are heated for a certain time and subsequently allowed to cool for a certain time so that the pressed record can be taken out, after removing the mould from the press and opening the upper part 2 of the mould. The edge which is formed by the partial expulsion of the core mass 19 is broken off, the record is finished around its circumference, tested for a satisfactory impression of the sound grooves, and then packed.

Depending on the material of which inserts 16 are made, they may be of circular shape with only one such insert on each side of the core. If, after the production of the pressed article, it is seen that the printed paper is torn—the paper always tends to tear in the direction of arrows 20, 21 at right angles to the pivotal axis of the mould halves—two possible courses are available to prevent this tearing. Firstly it is possible as shown in FIGURE 2, to provide two circular inserts 16', 16" on each side of core mass 19, which are so arranged that the surface of the sheet of paper 15 covered by these inserts, is larger in the direction of the arrows 20, 21 than in the direction at right angles thereto. Alternatively, it is possible to use only one insert 16''' which can have an oval shape as shown in FIGURE 3. Naturally the shape of these inserts can also be varied. It is only important that the length of the insert 16''', as in the case of the embodiment according to FIGURE 2, shall be greater in the direction of the arrows 20, 21 than in a direction at right angles thereto.

If 17 cm. gramophone records carrying visual material are to be produced, the diameter of the inserts 16, 16', or 16" can be 8 cms. If the surface of the core mass 19 which is indicated in FIGURES 2 and 3 by the chain lined circle 22—projects beyond the inserts at several points, this is of no importance in practice. It is thus not important if a part of the core mass comes directly into contact with the sheet of paper 15 or 18, prior to the actual pressing operation.

We claim:

1. A method of pressing phonograph records carrying visual material in a mold which comprises a matrix for impressing the sound track into said records, comprising inserting into said mold in superposition a foil of transparent material against said matrix and suitable to have sound tracks impressed thereinto, a printed paper sheet having the printed face thereof against the said foil, a foil insert of smaller surface area than said printed sheet and disposed thereagainst generally centrally with respect thereto and a body of thermoplastic material positioned upon said thin insert, and closing said mold and subjecting said superimposed parts to a pressing operation for distributing said thermoplastic material radially outwardly as a thin lamination over one face of said insert and over that portion of the corresponding face of said paper which is not covered by said insert.

2. A method for pressing phonograph records in a mold comprising two parts pivoted about an axis with respect to each other during the pressing operation according to claim 1, wherein said insert has a greater dimension in the direction essentially at right angles to the pivotal axis of the mold parts.

3. A method for pressing phonograph records in a mold comprising two parts pivoted about an axis with respect to each other during the pressing operation according to claim 1, wherein said foil insert comprises two foil parts overlapping each other and displaced with respect to each other in a direction generally normal to said axis.

4. A phonograph record assembly for carrying visual material comprising a paper sheet having the visual material printed on one side thereof, a foil of transparent material covering said one side of the paper and having a sound track pressed thereinto, a protective foil lying against a central area of said paper on the other side thereof and a radially extruded sheet of thermoplastic material overlying said protective foil and said opposite face of said printed sheet, said protective foil being so constructed and arranged as to prevent said paper sheet from tearing during radial extrusion of said thermoplastic material along one face thereof, said foils and said thermoplastic material being secured to said paper sheet only by a bond of the materials of said foils and said paper sheet and said thermoplastic material formed under pressure during heating.

5. A phonograph record according to claim 4, wherein said radially extruded sheet of thermoplastic material constitutes a central lamination of the record and further includes on the side thereof opposite said first-mentioned printed paper sheet a protective foil extending over a central area of said record, a second printed paper sheet overlying said second protective foil with a printed side thereof facing in the direction opposite the printed side of said first paper sheet and a foil of transparent material impressed with sound tracks overlying the printed face of said second paper sheet, said foils of transparent materials extending outwardly beyond the periphery of said printed paper sheets and being joined together at least at their peripheries.

6. A gramophone record as claimed in claim 4 in which said protective foil is soft polyvinyl chloride film.

7. A gramophone record as claimed in claim 5 in which said protective foils are inserts disposed on each side of said core.

8. A gramophone record as claimed in claim 5 in which said protective foils are inserts of generally oval shape.

9. A gramophone record as claimed in claim 5 in which said protective foils are formed by two circular inserts on each side of said core, the two inserts on each side partially overlapping one another.

10. A method of pressing a laminated article carrying visual material in a mold which comprises a matrix for pressing said laminated article, comprising inserting into said mold in superposition a foil of transparent material against said matrix, a printed paper sheet having the printed face thereof against the said foil, a foil insert of smaller surface area than said printed sheet and disposed thereagainst generally centrally with respect thereto and a body of thermoplastic material positioned upon said thin insert, and closing said mold and subjecting said superimposed parts to a pressing operation for distributing said thermoplastic material radially outwardly as a thin lamination over one face of said insert and over that portion of the corresponding face of said paper which is not covered by said insert.

11. A laminated article carrying visual material comprising a paper sheet having the visual material printed on one side thereof, a foil of transparent material covering said one side of the paper, a protective foil lying against a central area of said paper on the other side thereof and a radially extruded sheet of thermoplastic material overlying said protective foil and said opposite face of said printed sheet, said protective foil being so constructed and arranged as to prevent said paper sheet from tearing during radial extrusion of the said thermoplastic material along one face thereof, said foils and said thermoplastic material being secured to said paper sheet only by a bond of the materials of said foils and said paper sheet and said thermoplastic material formed under pressure during heating.

12. A gramophone record carrying material according to claim 4, wherein said core essentially consists of thermoplastic material.

13. A method for preventing tearing of the printed paper sheets carrying visual material during the manufacture of gramophone records carrying visual material and consisting of a core of deformable material having a printed paper sheet on each side thereof and a transparent foil covering each said sheet, said foil consisting of a material suitable for having sound tracks recorded thereon, comprising arranging said foils, paper sheets and core, interposing between each of said paper sheets and the adjacent surfaces of the core material at least one relatively thin insert having a surface area smaller than the surface area of said paper sheets, and thereafter pressing the assembly to thereby extrude said core in situ within said mold.

14. A method for preventing tearing of the printed paper sheets carrying visual material during the manufacture of gramophone records carrying visual material in a press mold having a lower part and an upper part pivotally secured thereto, said record consisting of a core of deformable material having a printed paper sheet on each side thereof and a transparent foil covering each said sheet, said foil consisting of a material suitable for having sound tracks recorded thereon, comprising arranging said foils, paper sheets and core in said mold, interposing between each of said paper sheets and the adjacent surfaces of the core material at least one relatively thin insert having a surface area smaller than the surface area of said paper sheets, said inserts each having a dimension in one direction larger than the dimension in a direction at right angles to said one direction, said inserts being arranged so that the larger dimension extends substantially at right angles to the pivot axis of said upper and lower parts, and thereafter pressing the assembly to thereby extrude said core in situ within said mold.

15. A method for preventing tearing of the printed paper sheets carrying visual material during the manufacture of gramophone records carrying visual material in a press mold having an upper and a lower part each of which carries a center pin, said record consisting of a core of deformable material having a printed paper sheet on each side thereof and a transparent foil covering each said sheet, said foil consisting of a material suitable for having sound tracks recorded thereon, comprising emplacing one of said foils and one of said paper sheets on the center pin of each of said mold parts, said foils and paper sheets having center holes corresponding to said center pins, placing a thin insert of soft polyvinyl chloride over the paper sheet in the lower mold part so as to cover the center pin thereof, placing a lump of said core-forming material on said foil insert, said material being sufficient to fill the mold when closed, at least partially covering said core-forming material with another thin foil insert, and thereafter pressing and heating the assembly so formed to thereby extrude said core in situ within said mold.

16. A method for preventing tearing of the printed paper sheets carrying visual material during the manufacture of gramophone records carrying visual material in a press mold having an upper and a lower part each of which carries a center pin, said record consisting of a core of deformable material having a printed paper sheet on each side thereof and a transparent foil covering each said sheet, said foil consisting of a material suitable for having sound tracks recorded thereon, comprising emplacing one of said foils and one of said paper sheets on the center pin of each of said mold parts, said foils and paper sheets having center holes corresponding to said center pins, placing a thin foil insert of soft polyvinyl chloride over the paper sheet in the lower mold part so as to cover the center pin thereof, placing a lump of said core-forming material on said foil insert, said material being sufficient to fill the mold when closed, at least partially covering said core-forming material with another thin foil insert, said foil inserts each having a dimension in one direction larger than the dimension in a direction at right angles to said one direction, said inserts being arranged so that the larger dimension extends substantially at right angles to the pivot axis of said upper and lower parts and thereafter pressing and heating the assembly so formed to thereby extrude said core in situ within said mold.

17. A method of manufacturing records carrying visual material according to claim 13, wherein said core consists of thermoplastic material.

References Cited in the file of this patent

UNITED STATES PATENTS

| | | |
|---|---|---|
| 1,416,342 | Emerson | May 16, 1922 |
| 1,454,845 | Clay | May 15, 1923 |
| 2,352,285 | Proctor | June 27, 1944 |
| 2,452,821 | Wood | Nov. 2, 1948 |
| 2,511,708 | Hammond | June 13, 1950 |
| 2,528,610 | Saffady | Nov. 7, 1950 |
| 2,528,611 | Saffady | Nov. 7, 1950 |

FOREIGN PATENTS

| | | |
|---|---|---|
| 333,175 | Great Britain | Aug. 5, 1930 |
| 258,355 | Switzerland | May 2, 1949 |
| 286,907 | Switzerland | Mar. 2, 1953 |
| 397,722 | Italy | Sept. 21, 1954 |